(12) United States Patent
Konomoto (10) Patent No.: US 6,499,573 B1
(45) Date of Patent: Dec. 31, 2002

(54) DAMPING DEVICE

(75) Inventor: Masashi Konomoto, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/926,539

(22) PCT Filed: May 29, 2001

(86) PCT No.: PCT/JP01/04488

§ 371 (c)(1),
(2), (4) Date: Nov. 16, 2001

(87) PCT Pub. No.: WO01/92753

PCT Pub. Date: Dec. 6, 2001

(30) Foreign Application Priority Data

May 31, 2000 (JP) ......................................... 2000-162057

(51) Int. Cl.[7] ................................................. F16F 9/12
(52) U.S. Cl. ...................... 188/322.5; 188/290; 188/293
(58) Field of Search ................................ 188/290, 293, 188/322.5; 267/267.1, 267.2, 266; 52/167.1, 167.8

(56) References Cited

U.S. PATENT DOCUMENTS 5,497,863 A  3/1996  Schmidt et al.
6,230,450 B1  5/2001  Kuroda et al.

FOREIGN PATENT DOCUMENTS

| JP | 3-41919 | 2/1991 |
| JP | 9-264492 | 10/1997 |
| WO | WO98/29625 | 7/1998 |

*Primary Examiner*—Christopher P. Schwartz
(74) *Attorney, Agent, or Firm*—Armstrong, Westerman & Hattori, LLP (57) ABSTRACT

There is provided a damping device for making large a damping force per unit length in an axial direction thereof. The damping device 20 is provided with a motion conversion section 21 for converting a relative linear motion between the two object portions to a rotational motion of a rotation member 30 and a damping section 22 operatively connected to the motion conversion section and adapted to resist the rotational motion of the rotation member. The damping section 22 is formed with the rotation member 30, an inner peripheral side sealing layer 34 disposed on an inner peripheral side of the rotation member 30 and an outer peripheral side sealing layer 33 disposed on an outer peripheral side of the rotation member. The inner and outer peripheral side sealing structure are sealed with viscous medium. Since the inner peripheral side sealing layer 34 and the outer peripheral side sealing layer 33 resist against the rotational motion of the rotation member 30, the damping force per unit length of the rotation member in its axial direction can be made large.

4 Claims, 7 Drawing Sheets

DAMPING DEVICE

TECHNICAL FIELD

The present invention relates to a damping device to be utilized for a seismic base isolation system or like preventing vibration at an occurrence of an earthquake or like from being transmitted from a base structure to a building structure and for a vibration suppression system or like preventing a multistoried building from being swung itself at an occurrence of an earthquake.

BACKGROUND ART

Figure 6:
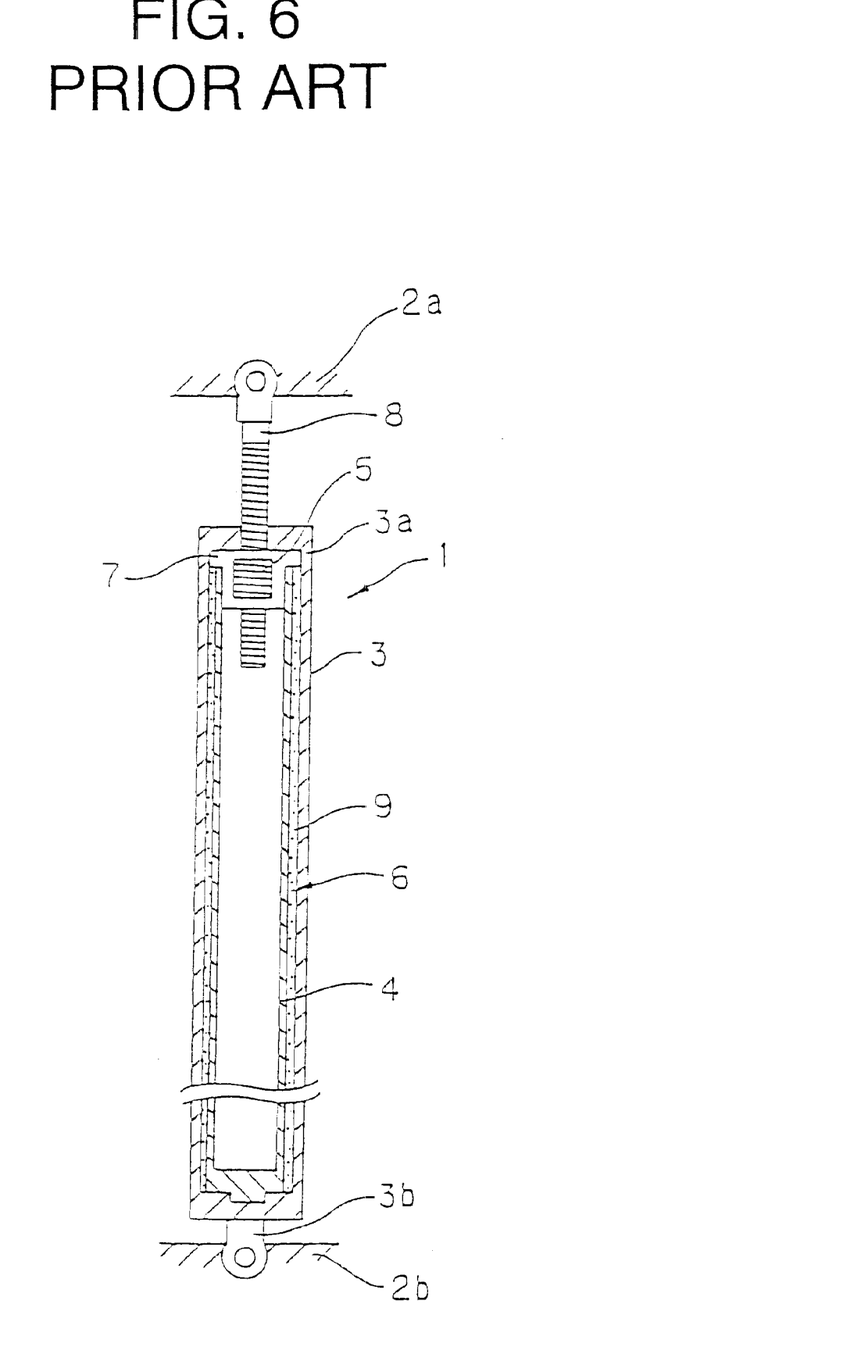
FIG. 6 is a sectional view of one example of a conventional damping device.

In a prior art, there is known a damping device for seismic base isolation system or vibration suppression system such as shown in FIG. 6 as damping device 1, which is disclosed in Japanese Patent Laid-open Publication No. HEI 10-184757. Such damping device 1 is disposed between two object (objective) portions 2a, 2b of a building or like for damping vibration of the object portions 2a, 2b.

With reference to FIG. 6, the damping device 1 is provided with a casing 3, a ball screw mechanism 5 for converting a linear motion between the object portions 2a and 2b to a rotational motion of a cylindrical rotation member 4 and a damping member 6 resisting the rotational motion of the rotation member 4. The ball screw mechanism 5 includes a nut 7 which is supported rotatably by the casing 3 and connected to the rotation member 4. The casing 3 has a base end 3b secured to one 2b of the object portions. The ball screw mechanism 5 includes a screw shaft 8 projecting outward from a front end portion 3a of the casing 3 and fixed to the other one 2a of the object portions.

The damping member 6 accommodates a viscous fluid 9 sealed between an inner peripheral portion of the casing 3 and an outer peripheral portion of the rotation member 4. According to such structure, the relative linear motion between the object portions 2a, 2b is converted to the rotational motion of the rotation member 4 by means of the ball screw mechanism 5, and at this time, the damping member 6 acts to resist the rotational motion of the rotation member 4.

Figure 7:
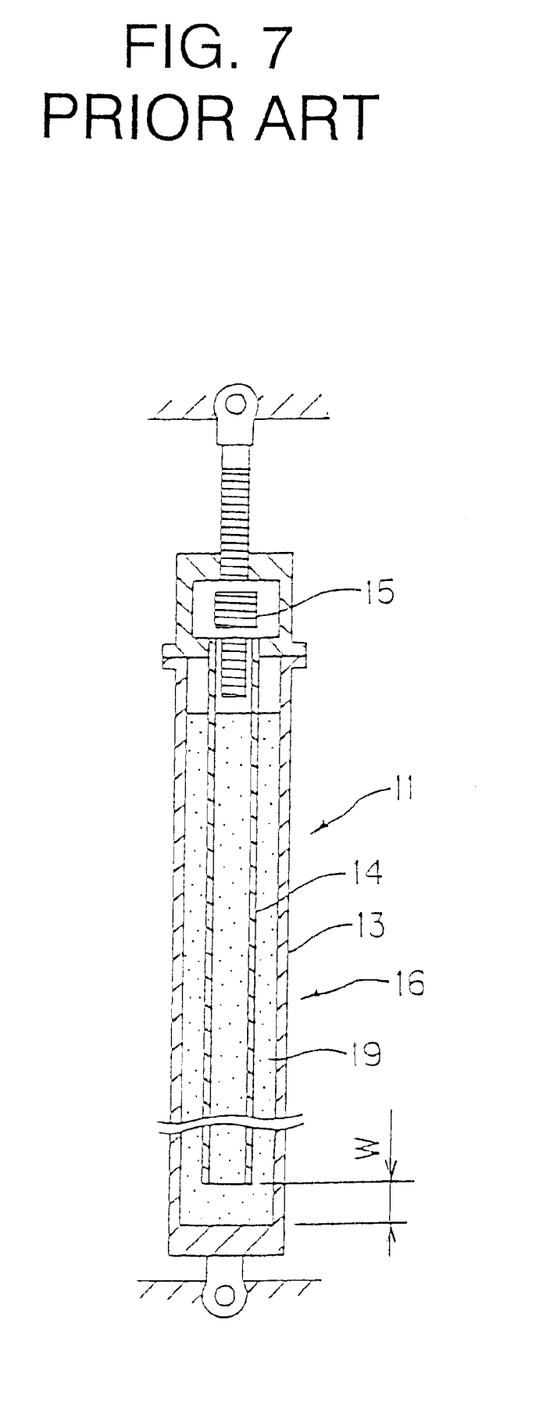
FIG. 7 is a sectional view of a modified example of the damping device of FIG. 6.

Further, the above Japanese Publication discloses a modified damping device 11 such as shown in FIG. 7. With reference to FIG. 7, the modified damping device 11 is provided, as is similar to the damping device 1 of FIG. 6, with a casing 13, a ball screw mechanism 15 for converting a linear motion between the object portions 2a and 2b to a rotational motion of a cylindrical rotation member 14 and a damping member 16 resisting the rotational motion of the rotation member 14. In this modified damping device 11, differing from the damping device 1 of FIG. 6, a gap W is formed between the front end (lower end as viewed) portion of the cylindrical rotation member 14 and the bottom portion of the casing 13 so that viscous fluid 19 fills not only outside the rotation member 14 but also inside the rotation member 14, and the viscous fluids inside and outside the rotation member 14 are communicated with each other at the inner lower portion of the casing 13.

In the damping devices 1 and 11 of the conventional structures, in order to impart a large damping force (damping power) to the rotational member 4 (14), it is necessary to increase contacting area between the rotation member 4 (14) and the viscous fluid 9 (19). However, in the conventional damping device 1 of FIG. 6, because only the outer peripheral surface of the rotation member 4 contacts the viscous fluid 9, it is difficult to make large the damping force per unit length in the axial direction of the rotation member 4 in its axial direction. In order to obviate such defects and make large the damping force, it becomes necessary to elongate the axial length of the rotation member 4, resulting in increasing of the size of the rotation member 4, i.e., entire damping device 1, providing an inconvenience in production of the damping device.

On the other hand, in the damping device 11 of FIG. 7, since the inner and outer peripheral surfaces of the rotation member contact the viscous fluid 19, the contacting area can be made large. However, in this structure, the viscous fluid 19 inside the rotation member 14 is rotated together with the rotation member 14 when rotated, and hence, the viscous fluid 19 inside the rotation member 14 cannot be fully shared. That is, the viscous fluid 19 inside the rotation member 14 cannot perform sufficient resisting function against the rotational motion of the rotation member 14, and as a result, it becomes difficult to make large the damping force per unit length in the axial direction of the rotation member 14, thus also providing a problem.

DISCLOSURE OF THE INVENTION

The present invention was conceived in consideration of the above circumstances in the prior art and aims to provide a damping device capable of making large a damping force per unit length of the damping device in its axial direction.

Hereunder, the present invention will be explained. Further, the description is made by adding reference numerals in the accompanying drawings for the sake of easy understanding of the present invention, but the present invention is not limited to the shown embodiment.

In order to achieve the above object, the inventors of the subject application provide a damping device (20, 50) for substantially preventing vibration from transmitting or causing between two object portions which comprises a motion conversion section (21) for converting a relative linear motion between object portions to a rotational motion of a rotation member (30) and a damping section (22) resisting the rotational motion of the rotation member (30), wherein the damping section (22) is provided with an inner peripheral side sealing layer (34) disposed on an inner peripheral side of the rotation member (30) and an outer peripheral side sealing layer (33) disposed on an outer peripheral side of the rotation member, the inner peripheral side sealing layer (34) and the outer peripheral side sealing layer (33) being sealed with viscous medium so as to achieve a resisting function against the rotational motion of the rotation member (30). Further, in this aspect, as the motion conversion section, various mechanisms may be utilized as far as they can convert the linear motion to the rotational motion, and for example, ball screw mechanism, screw mechanism having a lead and a rack/pinion mechanism may be utilized.

According to the subject feature of the present invention mentioned above, since the inner peripheral side sealing layer and the outer peripheral side sealing layer contact the rotation member, while resisting the rotational motion of the rotation member, the damping force per unit length of the rotation member in its axial direction can be made large. Further, in the case where a damping force is needed approximately corresponding to that in the conventional damping device, the axial length of the rotation member can be reduced in substantially half length, thus making compact the entire structure of the rotation member, i.e., damping device, in addition to easy manufacturing thereof.

The present invention is further characterized in that the damping section (22) is further provided with an outer cylindrical member (31) disposed outside the rotation member (30) and an inner cylindrical member (32) disposed inside the rotation member (30) and secured to the outer cylindrical member (31), the outer peripheral side sealing layer (33) is arranged between the outer cylindrical member (31) and the rotation member (30) and the inner peripheral side sealing layer (34) is arranged between the rotation member (30) and the inner cylindrical member (32), the inner and outer peripheral side sealing layers (34) and (33) being sectioned from each other.

According to the invention of this aspect, the inner peripheral side sealing layer and the outer peripheral side sealing layer are shared, so that the sealing layers can surely resist the rotational motion of the rotation member. For this reason, the damping force per unit length of the rotation member in its axial direction can be made large. In a case where the inner peripheral side sealing layer and the outer peripheral side sealing layer are communicated with each other, both the layers may adversely influence each other to act to weaken the damping force to the rotation member.

Furthermore, the present invention is characterized in that the rotation member (30) is supported by the outer cylindrical member (31) and the inner cylindrical member (32) through support means (37, 37, 38, 38). Bearings such as usual bearings, sliding bearings or like may be utilized.

As the factors for influencing the damping force, in addition to the contact area between the viscous fluid and the rotation member 30 as mentioned above, there will be listed up a gap between the rotation member and the outer cylindrical member and a gap between the rotation member and the inner cylindrical member, i.e., the thickness of the sealing layer. As the damping force is in reverse proportion to the thickness of the sealing layer, in order to make large the damping force, it is necessary to reduce the thickness of such sealing layer. In this regard, according to the present invention, since the rotation member is supported by the outer cylindrical member and the inner cylindrical member through supporting means such as radial bearings, respectively, the rotation member is free from the collision with the outer and inner cylindrical members even in the case of small gaps between the rotation member and the outer and inner cylindrical members, respectively. As a result, these gaps can be easily controlled, and moreover, the thickness of the sealing layers can be made small so as to make large the damping force per unit length in the axial direction of the rotation member.

Still furthermore, the present invention is characterized in that the motion conversion section (21) is provided with a casing (24) connected to the outer cylindrical member (31), a nut member (25) supported to be rotatable by the casing (24) through a support structure and a screw shaft (26) screwed with the nut member (25), and the rotation member (30) is coupled with the nut member (25).

Further, in the case where the screw mechanism is utilized for the motion conversion means, there is a tendency of increasing the axial length of the damping device due to the screw shaft. According to the present invention, however, since the axial length of the rotation member can be made short, the elongation of the axial length of the damping device can be suppressed even in the utilization of the screw mechanism.

BEST MODE FOR EMBODYING THE INVENTION

Figure 1:
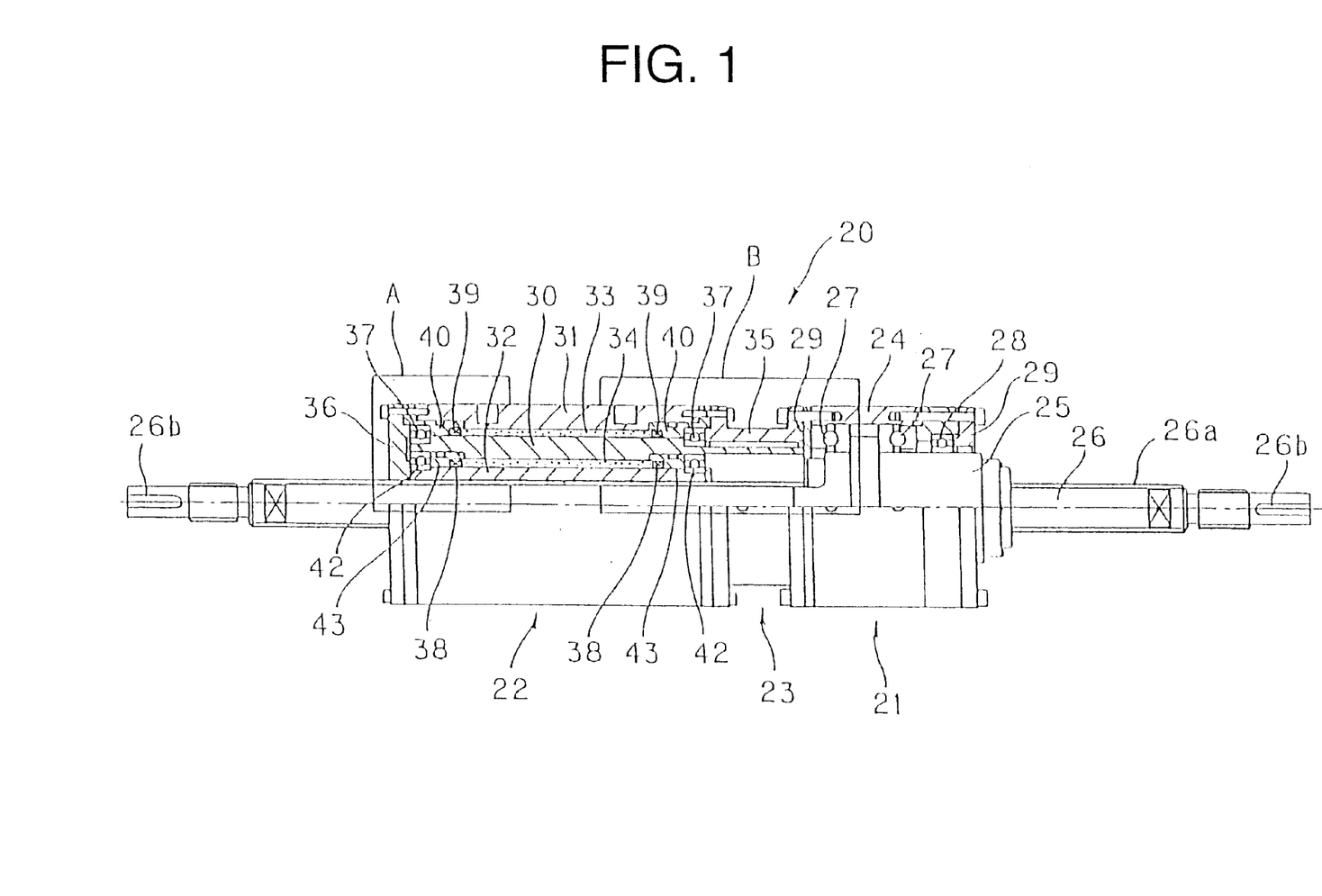
FIG. 1 is a side view, partially including a sectional view, of a damping device according to a first embodiment of the present invention.

FIG. 1 shows a damping device 20 of the structure according to the first embodiment of the present invention, and the damping device 20 is a device utilized for a seismic base isolation system capable of preventing the vibration at an occurrence of an earthquake from being transmitted from a base structure to a building structure or for a vibration suppressing system for suppressing the swinging of the multistoried building itself at the occurrence of the earthquake.

In the case of being utilized for the seismic base isolation system, the damping device 20 is disposed between the base structure and the building structure, both being object (objective) portions, so as to prevent the vibration of the base structure from being transmitted to the building structure.

In the case of being utilized for the vibration suppressing system, the damping devices 20 are disposed at orthogonal portions of, for example, frame-like structure, of a building as the object portion so as to suppress the swinging of the building itself (i.e., to damp a bending vibration).

The damping device 20 is provided with a motion converting section 21 as motion converting means for converting a relative linear motion between the two object portions to a rotational motion of a rotation member, a damping section 22 as damping means for resisting the rotational motion of the rotation member and a connection section 23 through which the motion converting section 21 and the damping section 22 are coaxially connected to each other.

The motion converting section 21 is composed of a cylindrical casing 24, a nut 25 supported by the casing 24 to be rotatable and a screw shaft 26 screw-engaged with the nut 25, and a number of balls being arranged between the nut 25 and the screw shaft 26. These balls roll along the outer periphery of the screw shaft 26 in accordance with the rotational motion of the screw shaft 26 with respect to the nut 25.

On the outer peripheral surface of the screw shaft 26, is formed a ball rolling groove in a spiral form, and key ways 26b, 26b for mounting are formed to both end portions of the screw shaft 26. Furthermore, a mount portion 26c (FIG. 4) in a disc shape to be mounted to one of the object portions is mounted to both or one of the end portions of the screw shaft 26. Further, in the illustrated example, although the screw shaft 26 has a length penetrating the damping device 20, the length may be made to be shorter than the length not penetrating the damping device based on the stroke between the object portions. The key way 26b may be formed to only one end portion of the screw shaft 26 as occasion demands.

The nut 25 has an inner peripheral surface to which a loaded rolling groove in a spiral shape is formed so as to oppose, in an assembled state, to the spiral ball rolling groove formed to the outer peripheral surface of the screw shaft 26.

The nut 25 is supported to be rotatable by the casing 24 through a pair of thrust bearings 27, 27 and a radial bearing 28 as supporting means. In an occasion that the space between the object portions is deformed (displaced) and one of the object portions undergoes a relative linear motion with respect to the other one of the object portions, a large axial force will be applied to a portion between the casing 24 and the nut 25 and then applied to the thrust bearings 27, 27. On the other hand, to the radial bearing 28, there is applied a radial force acting to the portion between the casing 24 and the nut 25. Further, these bearings 27, 27 and 28 are fixed to the casing through pressing members 29, 29.

The damping section 22 is provided with: a cylindrical rotation member 30, an outer cylinder (cylindrical member) 31 disposed outside the rotation member 30, an inner cylinder (cylindrical member) 32 disposed inside the rotation member 30 and fixed to the outer cylinder 31, an outer peripheral side sealing layer (structure) 33 disposed between the outer cylinder 31 and the rotation member 30 and an inner peripheral side sealing layer (structure) 34 disposed between the inner cylinder 32 and the rotation member 30 and filled up with the viscous fluid. The sealing layers 33 and 34 are sectioned from each other, and these sealing layers 33 and 34 act respectively to resist the rotational motion of the rotation member 30.

The outer cylinder 31 has a cylindrical structure having an outer diameter substantially equal to that of the casing 24 and one end of the outer cylinder 31 is connected to the casing 24 through a connection cylinder 35 of the connection member 23. A disc-shaped (annular) mount portion 36 for the attachment to the other one of the object portions is mounted to the other one end of the outer cylinder 31. In the damping device of the present invention, the distance between the two object portions is relatively displaced, and when one of the object portions is moved linearly relative to the other one of the object portions, the screw shaft 26 is moved relatively linearly in the axial direction with respect to the outer cylinder 31 and the casing 24, and the damping force is hence caused by the linear motion of the screw shaft 26 with respect to the outer cylinder 31.

Figure 2:
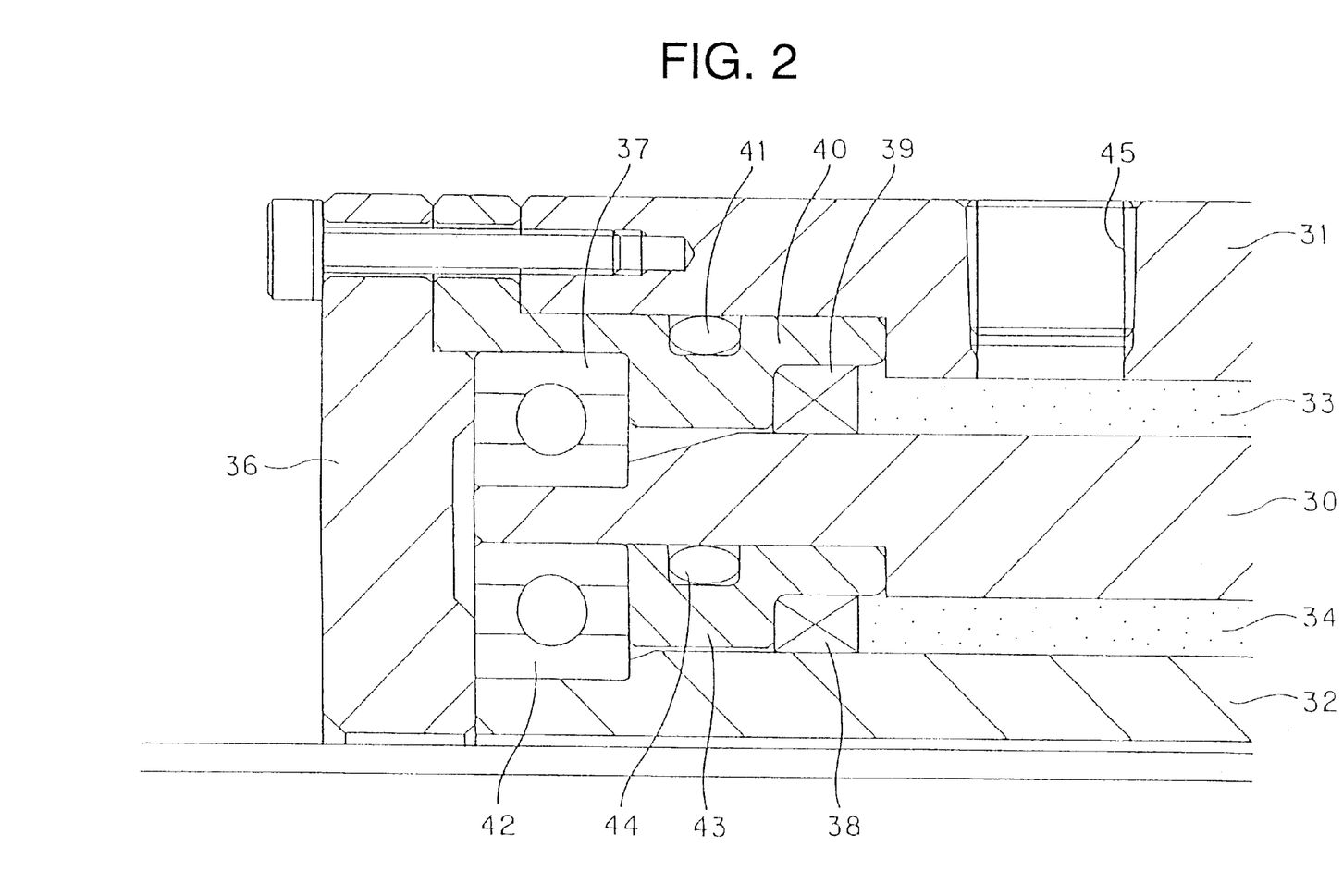
FIG. 2 is an enlarged view of a portion A in FIG. 1.
Figure 3:
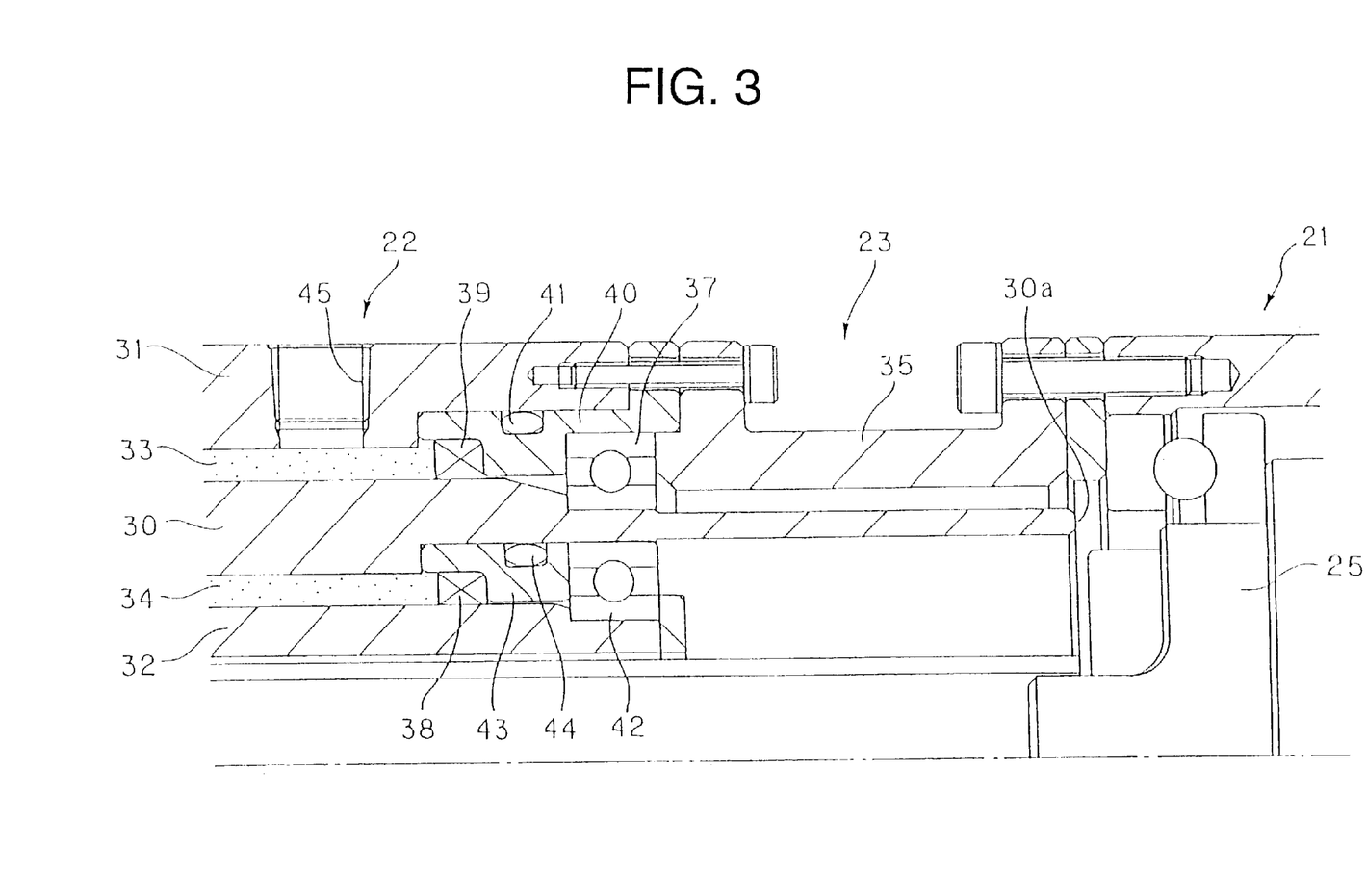
FIG. 3 is an enlarged view of a portion B in FIG. 1.

The rotation member 30 disposed inside the outer cylinder 31 also has a cylindrical structure having an axis coaxial with that of the outer cylinder 31. FIGS. 2 and 3 represent an assembled state of the rotation member 30 and the inner cylinder.

One end portion 30a of the rotation member 30 on the side of the motion converting member 21 is connected to the nut 25, and this connection will be performed in the following manner, for example. That is, a projection is formed to a peripherally apart portion of the one end 30a of the rotation member 30 and a recess is formed to the nut 25 so as to have a shape capable of being engaged with this projection of the rotation member 30. Through such engagement, the rotation member 30 and the nut 25 can be detachably coupled so that the rotational motion of the rotation member 30 can be transmitted to the nut 25. When the coupling between the connection cylinder 35 and the outer cylinder 31 is released, the motion conversion section 21 and the damping section 22 can be made dividable.

The rotation member 30 is supported at its both ends by the outer cylinder 31 to be rotatable through a pair of radial bearings 37, 37 as supporting means. One of these bearings 37 disposed on the side of the connection member 23 is pressed by the connection cylinder 35. On the other hand, the other one of the bearings 37 disposed on a side opposite to the above one radial bearing 37 is pressed by the annular mount portion 36. Inside the paired radial bearings 37, 37, a pair of mechanical seals 39, 39 are disposed as sealing means for sealing viscous fluid, and these mechanical seals 39, 39 are each disposed between the rotation member 30 and a seal receiving portion 40 secured to the outer cylinder 31 so as to allow the rotation member 30 to be rotatable with respect to the outer cylinder 31 while keeping the sealing function with respect to the viscous fluid. Furthermore, O-rings 41, 41 are disposed between the seal receiving portions 40, 40 and the outer cylinder 31 so as to prevent the viscous fluid from leaking. Viscous fluid supply ports 45, 45 are formed to the side surface of the outer cylinder 31.

A small gap is formed between the inner peripheral surface of the outer cylinder 31 and the outer peripheral surface of the rotation member 30 and the viscous fluid constituting the sealing layer 33 for the outer peripheral side is sealed. The viscous fluid may be called a viscous medium, which includes a medium or body having an elasticity (viscous elastic medium or body) or one having no elasticity. Polyisobutylene may be listed up as one preferred example of such viscous fluid.

The inner cylinder 32 disposed inside the rotation member 30 has a cylindrical structure which is secured to the outer cylinder 31. When the mount portion 36 is attached to the outer cylinder 31, the mount portion 36 presses the inner cylinder 32 to thereby secure the inner cylinder 32 to the outer cylinder 31. The rotation member 30 is supported at its both ends by the inner cylinder 32 to be rotatable through a pair of radial bearings 42, 42 as support means.

One of these bearings 42 disposed on the side of the connection member 23 is pressed by a portion, not shown, of the connection member 23. On the other hand, the other one of the bearings 42 disposed on a side opposite to the connection member 23 is pressed by the annular mount portion 36. Inside the paired radial bearings 42, 42, a pair of mechanical seals 38, 38 are disposed as sealing means for sealing viscous fluid, and these mechanical seals 38, 38 are each disposed between the inner cylinder 32 and a seal receiving member 43 secured to the rotation member 30 so as to allow the rotation member 30 to be rotatable with respect to the inner cylinder 32 while keeping the sealing function with respect to the viscous fluid. Furthermore, O-rings 44, 44 are disposed between the seal receiving portions 43, 43 and the inner cylinder 32 so as to prevent the viscous fluid from leaking.

A small gap is formed between the inner peripheral surface of the rotation member 30 and the outer peripheral surface of the inner cylinder 32 and the viscous fluid constituting the sealing layer 34 for the inner peripheral side is sealed. The sealing layers 33 and 34 on the outer and inner peripheral sides are sectioned from each other, without being communicated, by the mechanical seals 38 and 39 and the O-rings 41 and 44.

The damping device 20 of the structure mentioned above will be assembled by the following manner.

First, the motion conversion section 21 and the damping section 22 are independently assembled, which are then assembled together in a final stage by means of the connection member 23. In this final stage, the projection of the rotation member 30 is fitted into the recess of the nut 25 to thereby coaxially couple the nut 25 and the rotation member 30 to be rotatable.

In the damping device 20, one end of the screw shaft 26 of the motion conversion section 21 is secured to one of the object portions and the mount portion 36 of the outer cylinder 31 is secured to the other one of the object portions.

According to this structure, when an earthquake occurs, the distance between these two object portions is changed and relatively displaced. In this time, the motion conversion section 21 acts to convert the relative linear motion between the two object portions into the rotational motion of the rotation member 30. Since the rotation member 30 can be rotated relatively with respect to the outer cylinder 31 and the inner cylinder 32, which is fixed to the outer cylinder 31, the damping section 22 causes a resisting force in proportion to the rotating speed of the rotation member 30 due to viscous friction therebetween, and according to such resistance, the rotational kinetic energy of the rotation member 30 is transformed to a thermal energy or like, and hence, the damping device 20 generates a damping force. Further, the utilization of the ball screw mechanism allows the rotational speed of the rotation member to remarkably increase and to thereby obtain a large damping force.

The damping device 20 according to the present invention is provided with the viscous fluid sealing layers 33 and 34 at portions inside and outside the rotation member 30 in contact thereto so as to resist the rotational motion of the rotation member 30. Accordingly, the damping force per unit length in the axial direction of the rotation member 30 can be made large.

Further, in a case where it is required to obtain the damping force as much as that in a conventional damping device, according to the present invention, the length of the axial direction of the rotation member 30 can be made approximately half in comparison with the conventional structure, so that the rotation member 30, i.e., the damping device 20, can be made compact in the entire structure and such damping device 20 may be manufactured relatively easily.

Furthermore, as the factors for influencing the rotation member 30, in addition to the contact area between the viscous fluid and the rotation member 30 as mentioned above, there will be listed up a gap between the rotation member 30 and the outer cylinder 31 and a gap between the rotation member 30 and the inner cylinder 32, i.e., the thickness of the sealing layer 33 (34). As the damping force is in reverse proportion to the thickness of the sealing layer 33 (34), in order to make large the damping force, it is necessary to reduce the thickness of such sealing layer 33 (34). In this regard, according to the present invention, since the rotation member 30 is supported by the outer cylinder 31 and the inner cylinder 32 by means of the radial bearings 37 and 42, respectively, the rotation member 30 is free from the collision with the outer and inner cylinders 31 and 32 even in the case of small gaps between the rotation member 30 and the outer and inner cylinders 31 and 32. As a result, these gaps can be easily controlled, and moreover, the thickness of the sealing layers 33 and 34 can be made small so as to make large the damping force per unit length of the rotation member 30 in its axial direction.

Still furthermore, in the case of using the ball screw mechanism for the motion conversion section 21, there tends an increasing of the axial length of the damping device 20 due to the location of the screw shaft 26. According to the present invention, on the contrary, the axial length of the rotation member 30 can be made short, so that the damping device 20 can be prevented from being elongated in the axial direction thereof even in the utilization of the ball screw mechanism.

Figure 4:
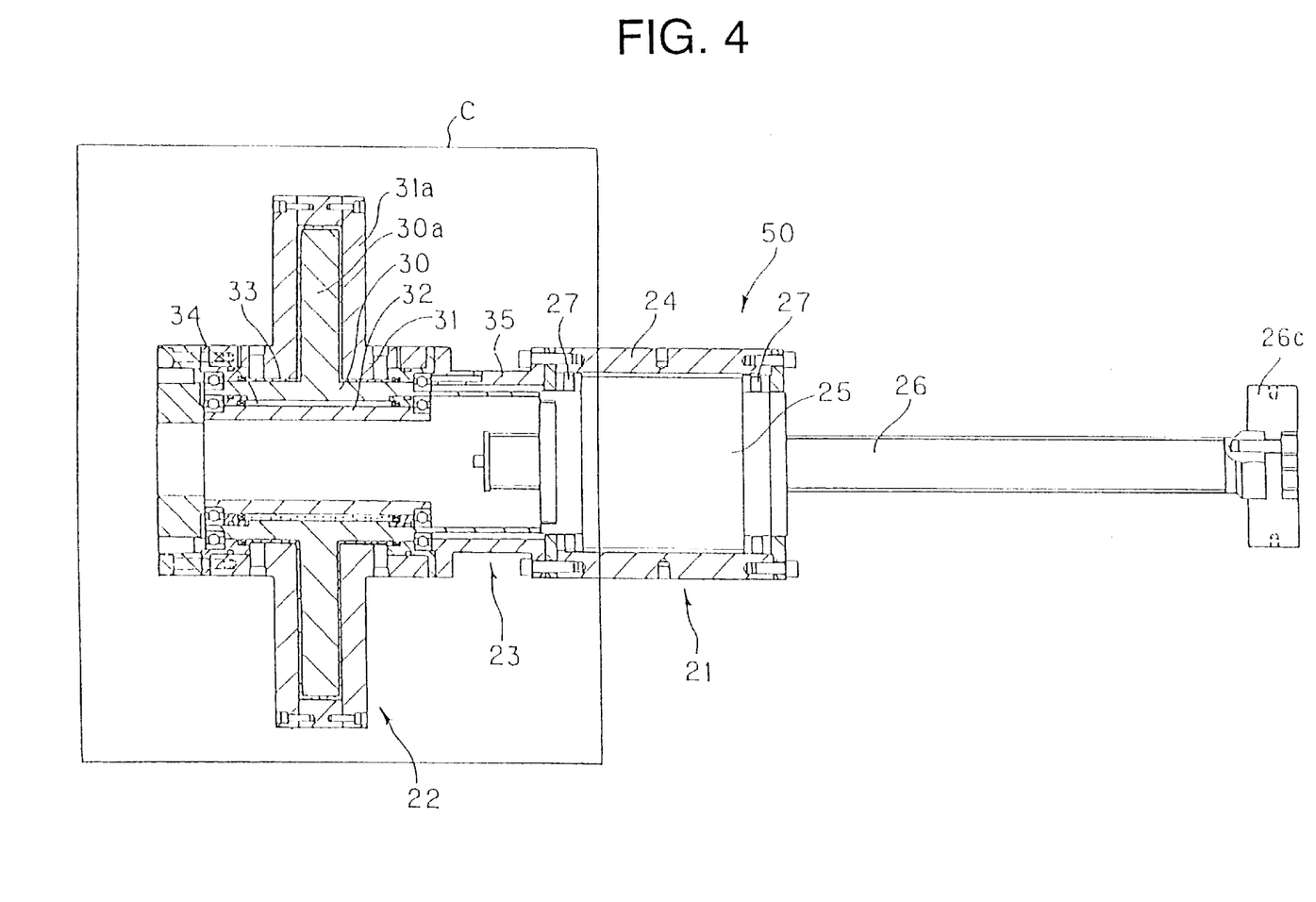
FIG. 4 is a sectional view of a damping device according to a second embodiment of the present invention.
Figure 5:
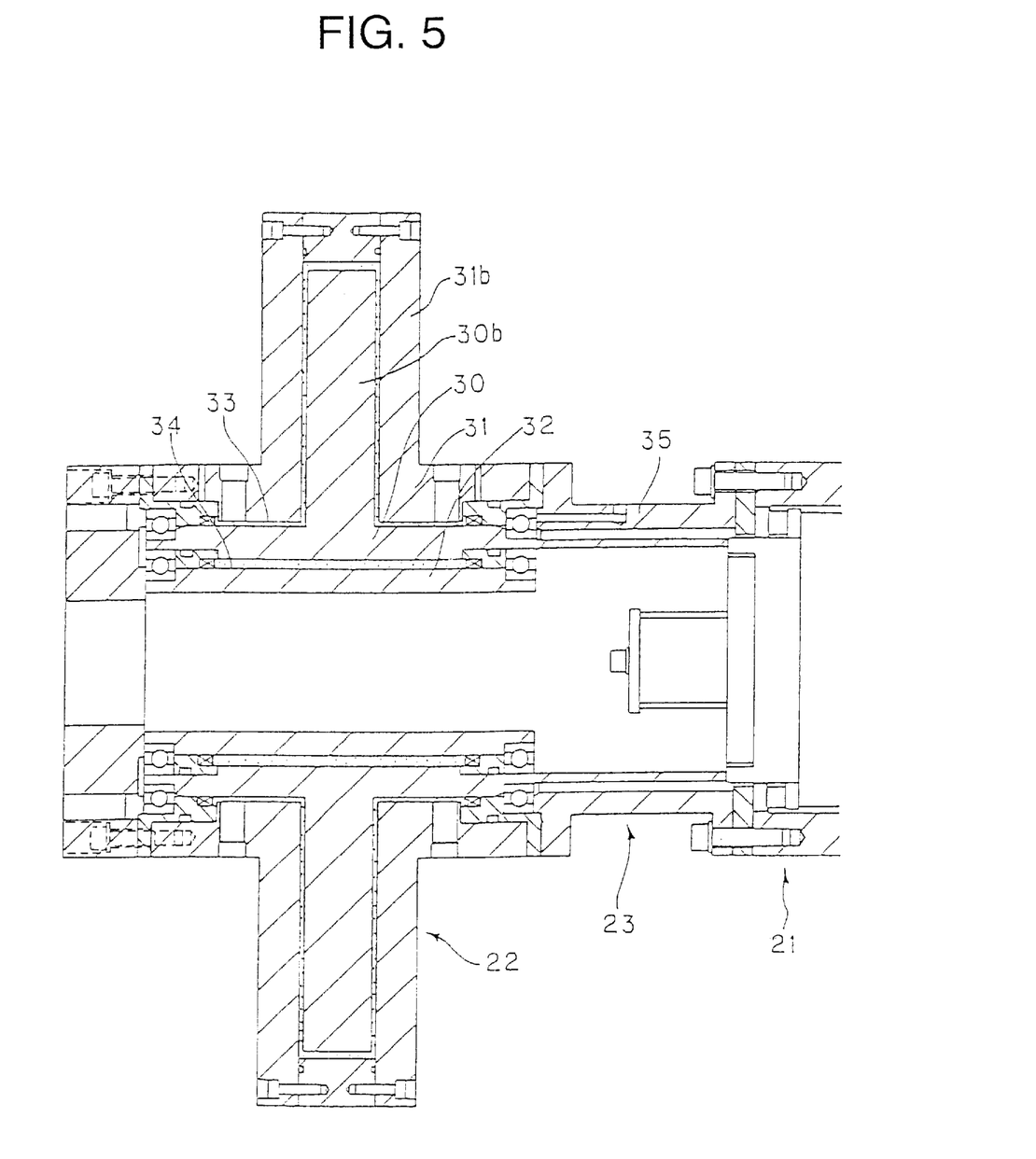
FIG. 5 is an enlarged view of a portion C in FIG. 4.

FIGS. 4 and 5 represent a damping device 50 according to a second embodiment of the present invention.

With reference to FIGS. 4 and 5, the damping device 50 is composed of, as like as the damping device 20 in the first embodiment, a motion conversion section and a damping section. The motion conversion section 21 has substantially the same structure as that of the first embodiment, and hence, the details thereof are omitted herein by applying the same reference numerals to the respective portions or elements. The damping section 22 is composed of as like as the damping section 22 of the first embodiment, the cylindrical rotation member 30, the outer cylinder 31 disposed to the outer peripheral side of the rotation member 30, the inner cylinder 32 disposed inside the rotation member 30 and secured to the outer cylinder 31, the sealing layer 33 for the outer peripheral side disposed between the outer cylinder 31 and the rotation member 30 and sealed with viscous fluid and the sealing layer 34 for the inner peripheral side disposed between the inner cylinder 32 and the rotation member 30 and sealed with viscous fluid, these outer and inner peripheral side sealing layers 33 and 34 being sectioned from each other. The sealing layers 33 and 34 have function resisting the rotational motion of the rotation member 30.

In the damping device 50 of the structure mentioned above, the rotation member 30 of the damping section 22 is provided with a disc (annular) portion 30b projected outward at a portion in the vicinity of the axially central portion of the damping section 22. In connection with such disc portion 30b, another disc (annular) portion 31b is formed to the outer cylinder 31 so as to surround the disc portion 30b. The viscous fluid also fills a gap between these disc portions 30b and 31b.

As mentioned above, the formation of the disc portions 30b and 31b permits to have a large contacting area, in the radial direction thereof, between the rotation member 30 and the outer peripheral side sealing layer 33, thus achieving a large damping force. Accordingly, in the case where it is required to obtain the damping force in magnitude similar to that obtained by a conventional damping device, the axial length of the rotating device 30 may be further reduced.

Further, in the embodiments described above, although the ball screw mechanism is utilized for the motion conversion section, another mechanism such as screw mechanism having a lead member, pinion/rack mechanism or like, which can convert the linear motion to the rotational motion, may be utilized in place of the ball screw mechanism such as in the described embodiments. Moreover, although the rotation member 30, the outer cylinder 31 and the inner cylinder 32 are all provided with cylindrical structures, these members are not limited to such cylindrical structures and may be constituted so as to have many other shapes as far as the outer and inner peripheral side sealing layers 33 and 34 have structures capable of resisting the rotational motion of the rotation member 30. Furthermore, in the described first and second embodiments, the sealing layers 33 and 34 are formed only on the outer and inner peripheral sides of the cylindrical rotation member 30, the rotation member 30 may be composed of a plurality of cylindrical portions having different diameters, and a plurality of sealing layers may be formed on the plural portions on the inner and outer peripheral sides of these cylindrical portions so as to resist the rotational motion of the rotation member 30.

As mentioned hereinbefore, according to the preferred embodiments of the present invention, the damping device is provided with a motion conversion section for converting the relative linear motion between the object portions to the rotational motion and the damping section resisting the rotational motion of the rotation member. The damping section is provided with an inner peripheral side sealing layer disposed on the inner peripheral side of the rotation member and an outer peripheral side sealing layer disposed on the outer peripheral side of the rotation member. Viscous fluid fills these sealing layers so as to resist the rotational motion of the rotation member. Accordingly, the damping force per unit length of the rotation member in its axial direction can be made large.

I claim:

1. A damping device comprising a motion conversion section for converting a relative linear motion between object-attachment portions of the damping device to a rotational motion of a rotation member and a damping section resisting rotational motion of the rotation member, wherein said damping section comprises an outer cylindrical member disposed outside the rotation member, an inner cylindrical member disposed inside the rotation member, an inner peripheral side sealing layer disposed between the rotation member and the inner cylindrical member, and an outer peripheral side sealing layer disposed between the rotation member and the outer cylindrical member;

said inner peripheral side sealing layer and said outer peripheral side sealing layer being sealed with a viscous medium so as to achieve a resisting function against the rotational motion of the rotation member;

and wherein said rotation member comprises a cylindrical portion supported by the outer cylindrical member and the inner cylindrical member on bearings disposed at both ends of said cylindrical portion.

2. A damping device according to claim 1, wherein the inner and outer peripheral side sealing layers are sectioned from each other.

3. A damping device according to claim 1 or 2, wherein said motion conversion section is provided with a casing connected to the outer cylindrical member, a nut member supported to be rotatable by the casing through a support structure and a screw shaft screwed with the nut member, and the rotation member is coupled with the nut member.

4. The damping device according to claim 1, wherein the rotation member and the outer cylindrical member are cylindrical in sections thereof.

* * * * *